United States Patent
Tempia Bonda

(10) Patent No.: US 8,437,351 B2
(45) Date of Patent: May 7, 2013

(54) METHOD AND SYSTEM FOR MULTICAST PATH SWITCHING, CORRESPONDING NETWORK AND COMPUTER PROGRAM PRODUCT

(75) Inventor: Alberto Tempia Bonda, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/132,310

(22) PCT Filed: Dec. 2, 2008

(86) PCT No.: PCT/EP2008/010195
§ 371 (c)(1),
(2), (4) Date: Jun. 1, 2011

(87) PCT Pub. No.: WO2010/063298
PCT Pub. Date: Jun. 10, 2010

(65) Prior Publication Data
US 2011/0235638 A1    Sep. 29, 2011

(51) Int. Cl.
*H04L 12/18* (2006.01)
(52) U.S. Cl.
USPC .......................................... 370/390; 370/240
(58) Field of Classification Search .................. 370/240, 370/390
See application file for complete search history.

(56) References Cited

U.S. PATENT DOCUMENTS

| | | | | |
|---|---|---|---|---|
| 6,331,983 | B1 * | 12/2001 | Haggerty et al. | 370/400 |
| 7,953,027 | B2 * | 5/2011 | Previdi et al. | 370/256 |
| 8,077,713 | B2 * | 12/2011 | Vasseur et al. | 370/390 |
| 2007/0019646 | A1 | 1/2007 | Bryant et al. | |
| 2007/0091827 | A1 * | 4/2007 | Boers et al. | 370/255 |
| 2007/0133530 | A1 | 6/2007 | Previdi et al. | |
| 2007/0189193 | A1 | 8/2007 | Previdi et al. | |
| 2008/0089234 | A1 | 4/2008 | Doong et al. | |
| 2008/0095161 | A1 | 4/2008 | Xu | |

OTHER PUBLICATIONS

L. Wei, Editor, et al..; "Protocol Independent Multicast-Sparse Mode (PIM-SM) : Protocol Specification," IEFT Standard-Working-Draft, Internet Engineering Task Force, vol. PIM, No. 1, pp. 1-64, (Oct. 1999).
International Search Report from the European Patent Office for International Application No. PCT/EP2008/010195 (Mail date Jul. 31, 2009).

* cited by examiner

*Primary Examiner* — Ricky Ngo
*Assistant Examiner* — Ben H Liu
(74) *Attorney, Agent, or Firm* — Finnegan, Henderson, Farabow, Garrett & Dunner, L.L.P.

(57) ABSTRACT

Multicast signals are transmitted from a source to user terminals via multicast paths through a set of nodes in a network. A first node, such as a 'last-hop' router, may send toward the source corresponding join and prune messages, the join message to establish a new multicast path from the source to a user terminal, and the prune message to discontinue the old multicast path from the source to the user terminal. The router sends the join message and the prune message over the new multicast path and the old multicast path. A second node located at the bifurcation of the new multicast path and the old multicast path detects the reception of both the join message and the prune message and steers, either directly or via delegated downstream nodes, the switch from the old multicast path over to the new multicast path without loss or undue duplication of packets sent from the source to the user terminal.

14 Claims, 6 Drawing Sheets

METHOD AND SYSTEM FOR MULTICAST PATH SWITCHING, CORRESPONDING NETWORK AND COMPUTER PROGRAM PRODUCT

CROSS REFERENCE TO RELATED APPLICATION

This application is a national phase application based on PCT/EP2008/010195, filed Dec. 2, 2008, the content of which is incorporated herein by reference.

FIELD OF THE INVENTION

This disclosure relates to transmission of multicast signals. More specifically, this disclosure relates to path switching in multicast transmission of signals.

DESCRIPTION OF THE RELATED ART

A common form of transferring data in a telecommunication network involves transmission from a single source to a single receiver: this is designated "unicast" transmission. Services however exist for which data transmitted by a source may be received by plural receivers (e.g. by a subset of the receivers included in a network). This approach in transferring data is designated "multicast" and corresponds to communication "from one to many."

Telecommunication networks based on IP protocol are able to handle both types of data transfer. In the case of multicast transmission, a source of information (for example a video server) specifies a destination address for the information traffic generated thereby in the form of a multicast IP address that identifies a so-called "multicast group". This corresponds to a flow of data packets to be received by a set of user terminals (for example one or more set-top-boxes or personal computers). Multicast IP addresses correspond to the so-called D Class of the space of IP addresses, namely the interval 224.0.0.0. 239.255.255.255.

Any terminal that desires to receive packets sent with a determined multicast destination address expressly requests this from the network by issuing a "Join" message. As a result of this message, the network is configured to transmit to the terminal issuing a Join message the packets belonging to the multicast group as specified.

Multicast transmission over an IP network may use (i) a multicast group management protocol to manage the Join requests issued by the terminals towards the routers in the IP network, and (ii) a multicast routing protocol to manage setting-up the path for transmitting the packets from the source to the multiple receivers.

The Internet Group Management Protocol (IGMP) is a protocol commonly used for managing multicast groups. Under IGMP, the terminals request that transmission of a given multicast group should be either started (via a Join request) or discontinued (via a Leave request): these operations involve an exchange of signalling packets between the terminals and the IP routers to which they are connected. These routers are the last to be traversed by the information traffic before reaching the receivers and are thus designated "last-hop" routers.

Multicast routing protocols have the task of calculating and configuring the path that the multicast packets will follow from the source to the receivers. From the topological viewpoint, the possible paths correspond to a tree, and are therefore designated multicast distribution tree. A multicast distribution tree can be calculated once all the receivers are known and individual receivers can be added as they send their Join request.

The most common multicast routing protocol is Protocol Independent Multicast-Sparse Mode (PIM-SM). Under PIM-SM, a multicast distribution tree is set up by proceeding from the last-hop routers (i.e. the leaves of the tree) to the source (i.e. the root of the tree). This occurs via a model based on which a link is traversed by a multicast flow only if at least one "downstream" receiver exists which has requested that flow via a Join procedure. The algorithm for setting up the tree optimizes the distance between the source and the receivers and calculation is distributed among the routers in the network: each router receiving a Join request propagates it towards the source, by choosing as the next router the "upstream" (in PIM terminology) router which is closer or closest to the source; this occurs on the basis of information contained in a unicast routing table.

Two types of distribution trees can be established on the basis of the PIM-SM protocol: shared trees and per-source or shortest path trees (SPTs).

Shared trees can be common to plural multicast groups (also with different sources); establishment thereof is based on a router, called the Rendezvous Point (RP). This is selected among the routers in the network and allotted the role of establishing communication between the receivers and the sources (which, at least initially do not known each other). Setting up the tree involves two phases: the traffic sources communicate their presence to the RP through a registration procedure, and the receivers send their Join requests towards the RP by using the optimal paths calculated by means of the unicast routing protocol, such as OSPF (Open Shortest Path First) and ISIS (Intermediate System to Intermediate System).

A shared tree can be correctly established if all the nodes in the network know the identity of the RP and are able to reach it. The RP, being aware of the requests from the receivers and of the sources that are active, connects the two segments in the tree, enabling end-to-end transmission of the multicast traffic flow.

However, since the tree is shared by plural multicast groups, it generally does not represent an optimal path. Conversely, as the designation itself indicates, per-source trees are specific for each source of multicast traffic. The paths from the source to the receivers are optimum in terms of distances and their construction is based on the assumption that the receivers are aware of the IP address of the source for the multicast group source.

This condition can be fulfilled in two ways:
  a shared-tree is initially established and, when the receivers begin to receive the multicast packets, they read the source IP address contained therein and establish an (optimum) tree for that source;
  the receivers are aware from the beginning of the source address (e.g. thanks to an explicit configuration) and can directly establish an SPT-tree.

The PIM-SM protocol adopts the former approach; nevertheless, a variant exists, designated PIM Source Specific Multicast (PIM-SSM), that may adopt the latter approach if the receivers know the IP address of the source.

A multicast traffic flow is generally identified by a pair of values of the type (S, G), where G represents the address of the multicast group and S is the IP address of the traffic source. If the identity of the source of the multicast flow is not known, the group is identified with the pair (*, G).

If topological changes occur in the network (for instance breakdown or addition of a link/node), the multicast routing protocol may be required to calculate a new multicast distribution tree in order to mirror the new network topology. Typically, the multicast distribution tree is modified by sending a "Prune" message over the branches that will be dispensed with (i.e. discontinued) and a "Join" message over the branches that will be added (i.e. activated).

This event is not exempt from having an impact on the traffic. Multicast routing protocols adopt a "break-before-make" approach, namely they discontinue (i.e. prune) the old branch or link before setting up a new one: in the interval between the time the old path is discontinued and the time the new path is established, multicast traffic is lost. If, conversely, a router delays discontinuing the old path, the risk arises that duplicate multicast traffic is propagated over both paths (i.e. old and new). This condition may sometimes turn out to be even more harmful than the loss of traffic inasmuch as it may produce congestion over certain lines in the network and adversely affect other types of traffic.

The problem of the loss of traffic possibly deriving from re-routing is known in the area of networking.

For instance, US-A-2007/0189193 describes a method to redirect multicast traffic in case of an imminent change in the topology of the network (for instance due to apparatus switchover). When detecting a topology change that requires calculation of a new multicast tree, the node identifies a new RPF (Reverse Path Forwarding) interface and sends a Join message over the new tree; the old information (for instance the old RPF interface) is maintained in the MFIB (Multicast Forwarding Information Base) and no Prune message is sent immediately on the old tree. Additionally, a flag associated to the multicast group is set in the MFIB to indicate that switchover is in progress. In that way, traffic is continued to be sent over the old tree. When the new tree is set up, the node begins to receive the multicast packets over the new tree, and from the time they are received on an interface different from the RPF stored in the MFIB, these packets are rejected. Such packets also trigger processes to complete the switchover: upon receiving the first packets on the new tree, the MFIB is adjourned with the new RPF interface, the Prune message is sent over the old tree and the flag is deleted.

Document US-A-2007/0133530 discloses a method to minimize packet loss or duplication when re-routing a multicast flow following a topology change in the network. This approach is based on the concept not to send the Prune message over the old path before the new path is established. To that end, the router that detects a topology change sends a Join message over the new path while continuing to receive the multicast flow over the old path. This message is a specific Join message seeking an acknowledgment (ACK) from the router that receives it: the first router to receive that message which is already receiving the associated multicast flow sends the acknowledgment required (over the flow). The router that issued the Join message discards the whole traffic possibly received over the new path until the acknowledgment is received: upon receipt of the acknowledgement it sends a Prune message over the old path and begins to accept the traffic from the new path.

Document US-A-2008/0095161 discloses a method to redirect a multicast flow from a path to another without interrupting transmission of traffic. This method relies on establishing a new path through the dispatch of a Join message, while traffic is received over the old path until the new path is operative. Only at this point the old path is discontinued by dispatching a Prune message.

Finally, document US-A-2008/0089234 discloses a method for efficient switching from a shared distribution tree to a shortest path tree (SPT). This method does not aim at avoiding loss or duplication of packets but rather attempts to minimize latency in multicast flows and the number of packets exchanged between the control plane and the forwarding plane.

OBJECT AND SUMMARY OF THE INVENTION

The inventor has observed that the documents considered in the foregoing do not properly address the problem of the loss/undesired duplication of multicast packets.

Specifically, the inventor has noted that, while addressing the problem outlined in the foregoing, certain solutions rely on the principle of waiting for the new tree being set up before discontinuing the old one. Traffic switching is completely managed by the router that detects the change and is unnoticed by for all the other apparatuses in the network. This mechanism simply effects a change in the behaviour of the apparatus (in particular the RPF check) that manages traffic switching.

The inventor has further noted that in those solutions based on a delay in discontinuing the old path and on the use of acknowledgment messages to understand when the new path has been established, during a certain time interval traffic is sent on both paths and received twice by the router located downstream even if the traffic received on one path is then discarded once the ACK is received. While somehow tackling the problem of moving a multicast flow between two paths, these solutions address it by delaying discontinuing the old path without however involving the other routers, which cannot exclude that duplicated packets are received.

This by keeping in mind, i.a., that while acceptable in the case of events such as breakdowns, packet loss is not acceptable in the case of restoration from a breakdown and, in the context of this disclosure, in the case of switching between two distribution paths in a multicast network.

The object of the invention is thus to provide a satisfactory solution to the issues outlined in the foregoing.

According to the present invention, that object is achieved by means of a method having the features set forth in the claims that follow. The invention also relates to a corresponding system (i.e. a node), a corresponding multicast communication network as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of the arrangement described herein is able to switch a multicast traffic flow from a path to another without loss or duplication of packets.

An embodiment of the arrangement described herein relies on noting that a make-before-brake approach is preferable to minimize and notionally dispense with traffic losses, especially, but not exclusively, when passing from a shared-tree to a SPT-tree.

An embodiment of the arrangement described herein allows changing the path followed by a multicast flow without loss or duplication of packets and without resorting to any numbering of the multicast packets.

An embodiment of the arrangement described herein is based on the concept of preparing beforehand the apparatus involved in the traffic switch (that is the routers both in the old path and in the new path) and causing an upstream router, common to both paths, to steer in a synchronized manner the traffic switch.

In an embodiment, this result is obtained by sending modified Join and Prune messages over the new and the old paths, respectively. The effect of such messages is to alert the intermediary routers that a switch of the multicast path will occur, but only when this will be decided by the router common to the two paths (e.g. through the dispatch of marked multicast data packets).

In an embodiment, the arrangement described herein does not require any new protocol, but merely relies on modified Join and Prune messages, and a corresponding change in router apparatus so that such modified Join/Prune messages can be recognized and processed.

In an embodiment, marking of certain multicast packets (e.g. by modifying a field in the IP header) is resorted to in order to optimize traffic switch.

In an embodiment, when an intermediary router receives a modified Join message, it will not immediately send the corresponding multicast traffic on the Join receive interface; this will occur only when a marked data packet is received. Likewise, when a router receives a modified Prune message, it will not stop sending corresponding multicast on the Prune receive interface until a marked data packet is received.

An embodiment of the arrangement described herein takes into account the use of new messages possibly consisting of existing messages that are just suitably modified.

In an embodiment of the arrangement described herein, traffic switch is requested by the router that detects the topology change, involves preparing the intermediate apparatus for the switch and is managed from upstream (rather than downstream) of the two paths affected by the switch.

An advantage of the arrangement described herein lies in that multicast traffic switchover from a path to another can be managed by apparatus located on both paths, so that no packets go lost or are transmitted on both paths (causing undue duplications).

The arrangement described herein does in no way rely on the use of acknowledgment messages and avoids sending the same traffic on both paths in that the switching process is managed from upstream of the two paths involved in the switchover.

Concerning the IETF standard protocol PIM-SM ("Protocol Independent Multicast-Sparse Mode (PIM-SM): Protocol Specification (Revised)"—RFC 4601—Chapter 4.5), as used by the routers to build multicast trees, embodiments of the arrangement described herein involve the use of modified Join and Prune messages and a minor change at the node level to correctly interpret and process the messages.

BRIEF DESCRIPTION OF THE ANNEXED VIEWS

The invention will now be described, by way of example only, with reference to the enclosed views, wherein.

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
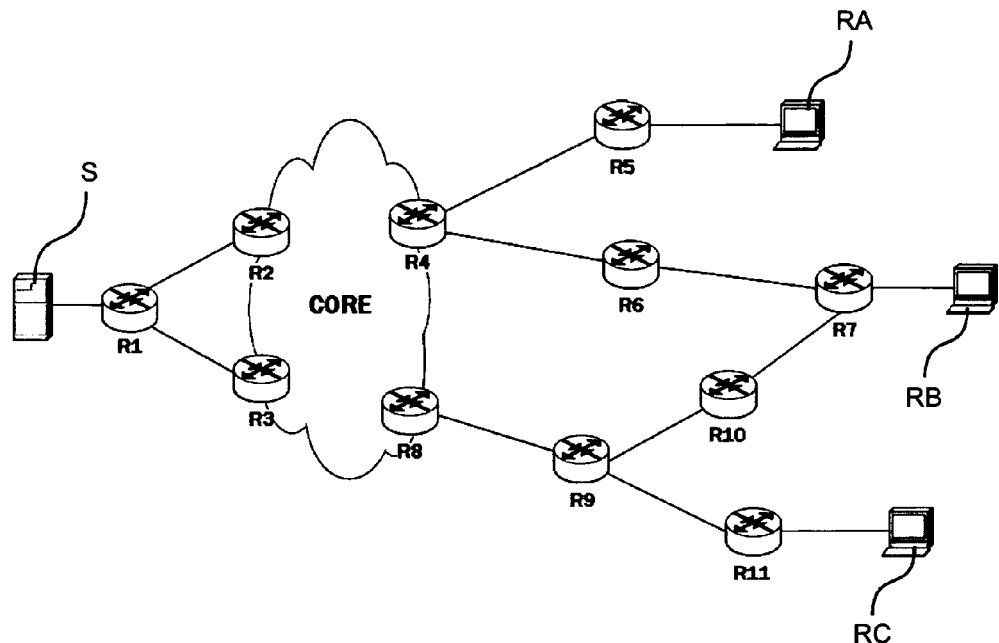
FIG. 1 is schematically representative of a possible scenario of use of the arrangement described herein.

FIG. 1 is exemplary of a network scenario where a plurality of receivers RA, RB, RC, . . . (three receivers are shown by way of example) receive multicast information such as e.g. audio/video data streams provided by a source S. The source S is connected to the network via a highest level router R1 from which the multicast traffic is sorted to the receivers RA, RB, RC, . . . through a network core and "aggregation" apparatus such as routers. While routers R2 to R11 are illustrated in FIGS. 1 to 4 by way of example, any number of routers can be included in a network as considered. The routers closer or closest to the receivers RA, RB, RC . . . are currently referred to as "last-hop" router.

The network topology may be more complex than illustrated in FIG. 1, in that plural traffic sources may be included. A single source arrangement will however be considered throughout this exemplary description for the sake of simplicity.

Figure 2:
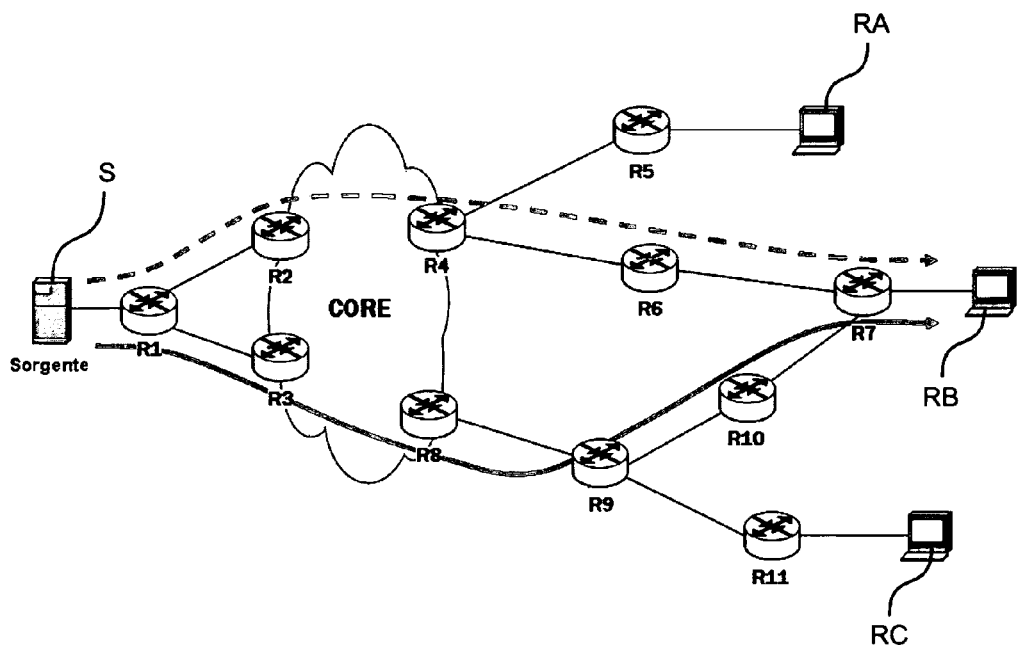
FIGS. 2 to 4 are exemplary of operation of the arrangement described herein.

FIG. 2 refers to an exemplary case where, while the receiver RB is receiving a multicast flow (S, G) via a path passing through the routers R1-R3→R8-R9-R10-R7, a router on the path (R7) may become aware (in a manner known per se, which is of no specific interest herein) that an alternative path exists from the source S. Such alternative path may be more convenient, e.g. for reasons of cost, because it includes a lower number of router to router "hops": FIG. 2 exemplifies such an alternative path as a path passing through the routers R1-R2→R4-R6-R7.

The router R7 (or, more generally, the network management function) may thus decide to switch the traffic to the receiver RB over the "new" alternative path. The "old" and "new" paths are separated in the core of the net, but rejoin at R1, that is at the point of access to the net by the source of the multicast traffic.

In a conventional manner, the router R7 would trigger the traffic switch by sending corresponding Join and Prune messages (i.e. Join and Prune messages concerning the same multicast group), namely a Join message to establish the new path to the "upstream" router in the new path (here R6), and a Prune message to discontinue the old path to the "upstream" router in the old path (here R10). As discussed in the foregoing, a drawback of this approach may lie in that the old path is discontinued as soon as the Prune message is sent, while the new path is not established until the Join message is propagated: traffic may therefore be lost in the interval between the time the old path is discontinued and the time the new path is established.

In the embodiment described herein, modified Join/Prune messages are issued which have a delayed effect: these modified messages have the purpose of preparing the intermediary routers to the traffic switch, which will in fact take place only following the receipt of a given modified multicast data packet.

For instance, when becoming aware of the availability of a "new" path to be preferred to the "old" one e.g. in terms of cost, the first router (R7 will again be referred to for the sake of description), will send a modified Join message (hereinafter denoted Join*) over the new path and a modified Prune message (hereinafter denoted Prune*) over the old path. These messages will propagate towards the source S following two separate paths, which will eventually rejoin before reaching the source. This means that a second router located at the bifurcation of the two paths will receive both the messages J* and P* and then be able to "steer" (i.e. effect either directly or via a delegated router located downstream) the path switch.

A main advantage of this approach, in comparison with the conventional multicast traffic switchover procedure considered in the foregoing, lies in that the old path is discontinued only after the new path has been established, and, more to the point, in that traffic switch is steered by an apparatus having visibility on both paths. Traffic can thus be switched over to the new path without loss or duplication of packets.

More in detail, still referring to FIG. 2, let us assume that the receiver RB receiving the flow (S, G) on the path R1-R3→R8-R9-R10-R7 (full line in FIG. 2), discovers that a new, best cost path exists passing through routers R1-R2→R4-R6-R7 (dashed line in FIG. 2).

At this point, in order to request that the traffic should be switched over to the new path, the router R7 will send a Join*(S, G) message to the router R6 on the new path and a Prune*(S, G) message to the router R10 on the old path. These packets are forwarded further upstream towards the source S via the intermediary routers and will eventually both reach a router (e.g. R1) which is included in both paths.

When receiving the Join*(S, G) message, in addition to forwarding it "upstream" (e.g. to R4) towards the source, the router R6 will memorize the interface over which it has received the Join*(S, G) message, by associating it to the multicast group (S, G), without however sending the traffic on that interface: this is feasible, e.g. by including that interface among the output interfaces in the MRIB (Multicast RPF Routing Information Base) associated with that multicast group, but placing it in a "pending" state by means of a flag.

The router R4 (and all the routers upstream traversed by the Join*(S, G) message up to R1) will follow the same course of action.

In an analogous, complementary manner, when receiving the Prune*(S, G) message, in addition to forwarding it "upstream" (e.g. to R9) towards the source S, the router R10 will memorize the interface over which it has received the Prune*(S, G) message, by associating it to the multicast group (S, G), by however continuing to send the traffic on that interface: this is feasible, e.g. by marking that interface as "pruning" by means of a flag but without cancelling it from the MFIB.

The router R8 (and all the routers upstream traversed by the Prune*(S, G) message up to R1) will follow the same course of action.

A router such as R1, located on both paths, will eventually receive both messages (e.g. the Join* message from the router R2 and the Prune* message from the router R3). This will generally occur at different time instants.

When receiving the first of the Join* or Prune* (whichever this is) on a first interface, a router such as R1 will generally forward it to any router further upstream (if existing) toward the source and memorize the interface by associating it to the multicast group (S, G).

When receiving (on another interface) the second message, the router in question will become aware of being the router at the bifurcation of the "old" and the "new" paths. At this point, it will not forward the (second) message further upstream, but rather manage itself the traffic switch.

The router R1 being the one which steers the path switch ensures that this occurs without adverse impact on the traffic (i.e. without losses or duplications). In fact, certain out-of-sequence packets may result if the first packets sent over the new path chance to reach R7 in advance with respect to the last packets sent over the old path: this loss of sequencing can however be easily managed and resolved at the receiver level (e.g. by means of a buffer).

As regards traffic dispatch, the switch is almost completely managed by the router at the bifurcation of the two paths (R1, in the example considered): when the router R1 receives both the Join*(S, G) and the Prune*(S, G) message, this means that the intermediate routers down to R7 will be ready for the path switch, so that the traffic can be switched from one path to the other. Traffic switchover is effected in such a way that transmission of multicast traffic is discontinued on the old path and resumed on the new path in correspondence with a precise packet.

By referring to a—notional—numbering of packets, R1 sends the multicast flow towards R3 up to the Nth packet and then towards R2 starting from the N+1th packet. This way of operation ensures that each packet in the multicast flow is sent once and only once. In order to alert the intermediary nodes of the switch being effected, the last packet sent over the old path and the first packet sent over the new path (i.e. the Nth and N+1th) may be marked, for instance by setting a flag in their IP header.

Marking of packets may be superfluous if no receiver other than RB is requesting the same flow (S, G). If other receivers are requesting the same flow, while steering the switchover process, the router R1 may not effect the switch directly, but rather entrusting the task of adding/pruning branches in the multicast tree to delegate intermediary routers. The marked packets are useful in informing any such router on the instant where a branch of the tree is to be added or cut.

Figure 3:
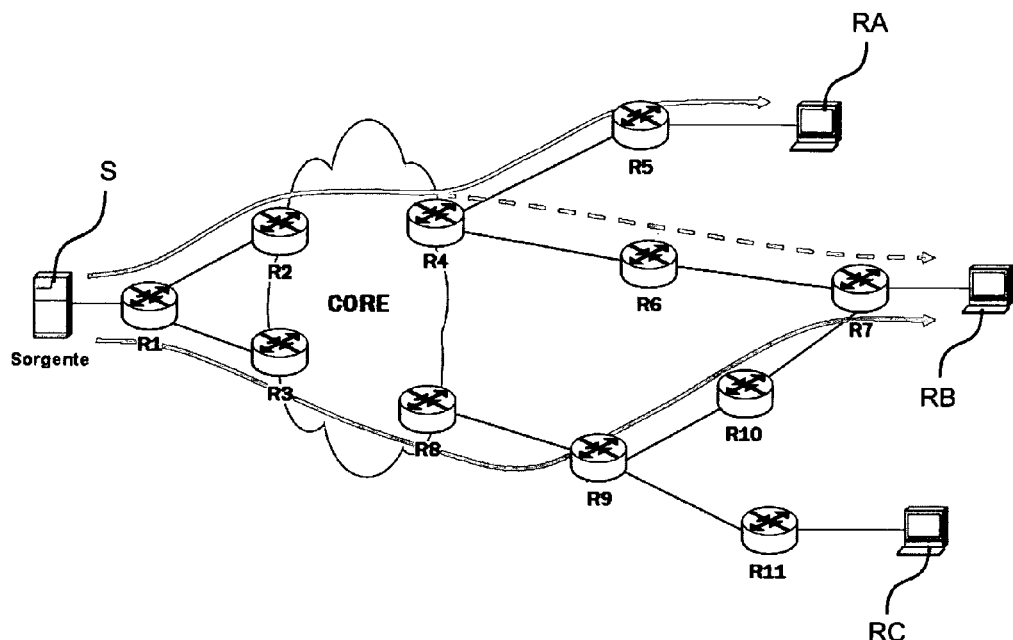
Figure 4:
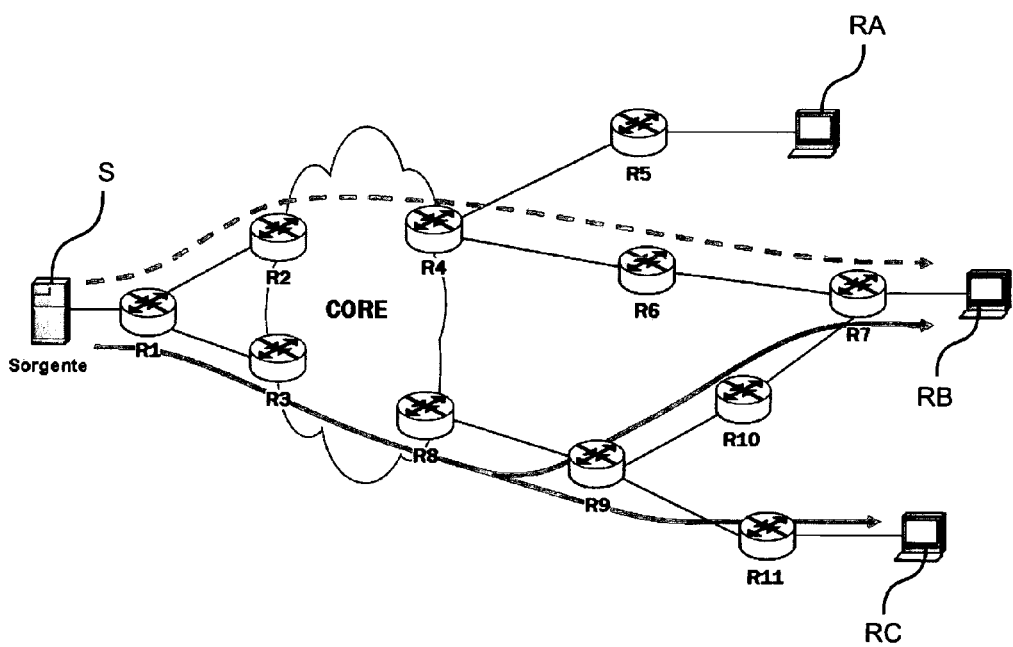

FIGS. 3 and 4 are exemplary of two operational scenarios where marking of packets is useful for that purpose.

Specifically, FIG. 3 is representative of a case where, in addition to the receiver RB, also the receiver RA is requesting the multicast flow (S, G), with the receiver RA otherwise not requesting any traffic switch to a new path. In this case, the router R7 acts as described previously, namely by sending the Join*(S, G) and Prune*(S, G) messages towards the source S via R6 and R10, respectively, so that these messages both reach a router located at the point of intersection of the two paths (i.e. R1, in the exemplary case considered here). Operation of the intermediate routers and R1 is substantially similar to operation as described previously.

Specifically, when deciding to switch the multicast traffic from the old path over to the new path, the router R1 stops sending that traffic to R3. However, the router R1 is already sending the same traffic over the new path through R2 and R4 to serve the receiver RA. Creating the new path towards the receiver RB thus involves that the router R4 should start sending to R6 the traffic it already sends to R5 (to serve the receiver RA). The instant at which R4 begins to send the traffic (also) to R6 is determined by the receipt by R4 of a packet marked at R1 as the first packet sent on the new path towards the receiver RB. The router R2 will treat such a marked packet as a part of the traffic already sent to the interface on which it received the Join*(S, G) message.

Beginning from that marked packet, the router R4 begins to send the multicast flow towards the interface previously labelled as "pending", that is toward R6, by removing that interface from the "pending" status. In that way the traffic will begin to reach the receiver RB using the new path.

FIG. 4 is representative of a case where, in addition to the receiver RB, also the receiver RC is requesting the multicast flow (S, G), with the receiver RC otherwise not requesting any traffic switch to a new path.

Again, operation of the router R7 (i.e. sending the Join*(S, G) and Prune*(S, G) messages towards the source S via R6 and R10, respectively, so that these messages both reach the router R1), the intermediate routers and R1 is substantially similar to operation as described previously. However, when deciding to effect the path switch, the router R1 will not stop sending the traffic to R3, inasmuch as, in so doing, it would interrupt the information flow to the receiver RC.

Also in this case, an intermediary router (R9 in the exemplary case considered) comes into play. Effecting the switch steered by R1 involves the router R9 interrupting the traffic towards the router R10, while maintaining the traffic flow to the router R11. Also, the routers arranged upstream of R9 will maintain the multicast flow even after receiving the "marked" multicast packets.

To that effect, before sending the prune message to the upstream router R8, the router R9 will change the Prune*(S, G) message to a Prune**(S, G) message, so that any router further upstream (e.g. R8 in the example herein) that receives that prune message will forward it towards the source S without however setting to "pruning" the status of the interface upon which the message was received. The message propagated towards the source S will thus be used by R1 only to be associated with the Join*(S, G) message to understand that a path switch has been requested for the multicast flow (S, G).

Again, R1 will mark the last packet sent to the receiver RB over the old path, but will continue to send the multicast flow to R3 as this is requested by another receiver, namely RC. The intermediary routers from R3 to R8 will not modify their operation following the receipt of the marked packet inasmuch as none of their interfaces is in the "pruning" status. Conversely, the router R9, whose interface towards R10 is set to the "pruning" state, will stop sending the traffic towards R10 beginning from the marked packet and delete that interface. From this moment onwards, the router R7 will no longer receive the traffic over the old path, while beginning to receive it over the new path.

Figure 5:
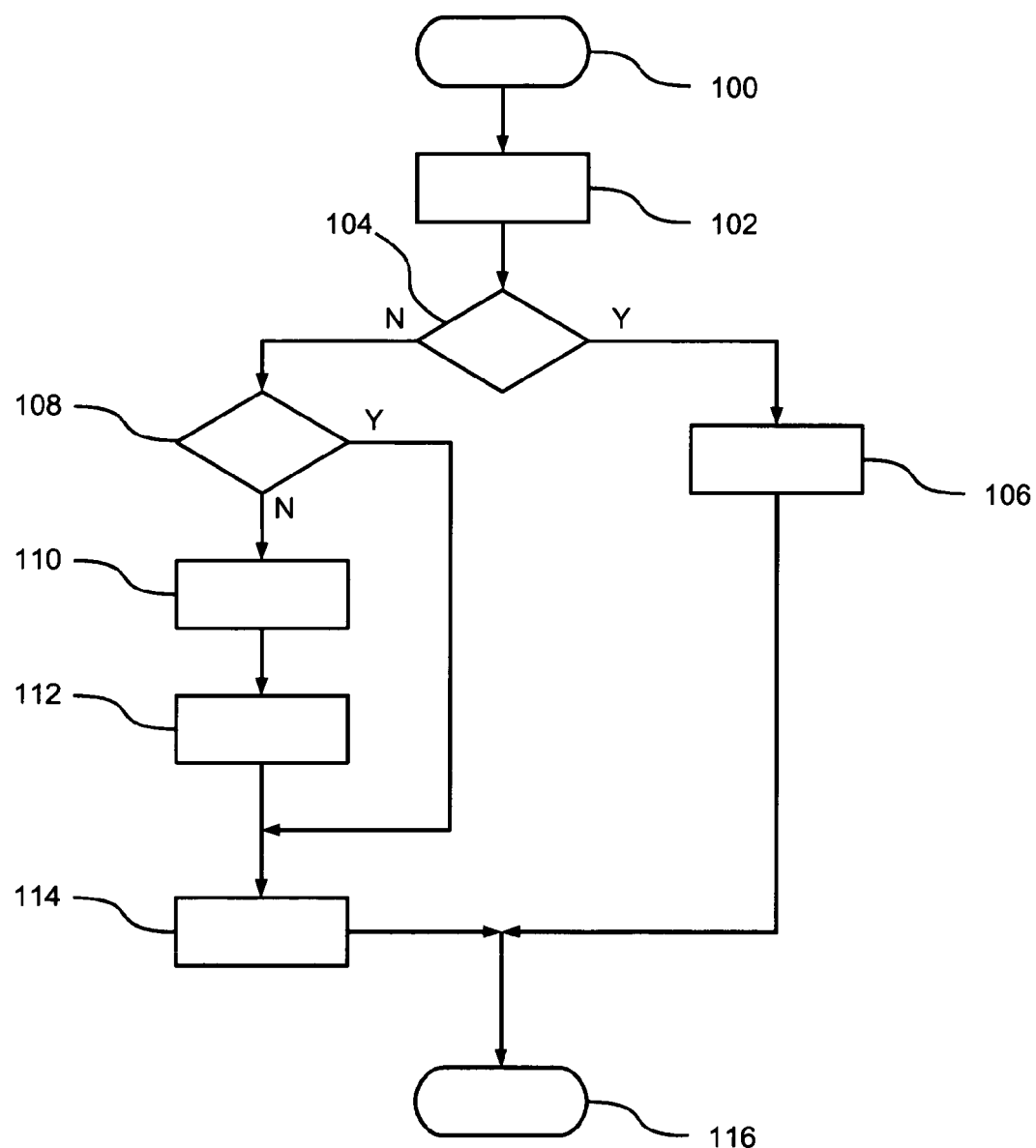
FIG. 5 is a flow chart illustrative of operation of the arrangement described herein when a Join message is received.

The flowchart of FIG. 5 is illustrative of exemplary operation of a router in a network as described herein, when receiving a Join*(S, G) message. The flowchart is described taking FIG. 3 as a reference.

Starting from a step 100, when a router receives (in a step 102) a Join*(S, G) message from a downstream router, a verification is first made in a step 104 as to whether is has previously received a Prune*(S, G)—or Prune** (S, G)—message related to the same multicast group.

If the step 104 yields a positive outcome, the router is located at the bifurcation of the old path and the new path (see e.g. the router R1 in the previous examples), and—in a step 106—will steer the path switchover process.

If the step 104 yields a negative outcome, the router is an intermediate router (e.g. R2, R4 or R6 in the previous examples). A verification is then made (in a step 108) as to whether the router is already sending the flow (S, G) on the interface over which the Join*(S, G) message was received.

With reference to the previous examples, such a check will yield a positive outcome for the router R2 and a negative outcome for the routers R4 and R6. These later routers will thus add (in a step 110) such interface to the Outgoing List related to the multicast group and set it (in a step 112) to a "pending" status.

Whichever the outcome of the step 108, in a step 114 the router will forward the Join*(S, G) message to its upstream router.

Step 116 denotes the end of the process.

Figure 6:
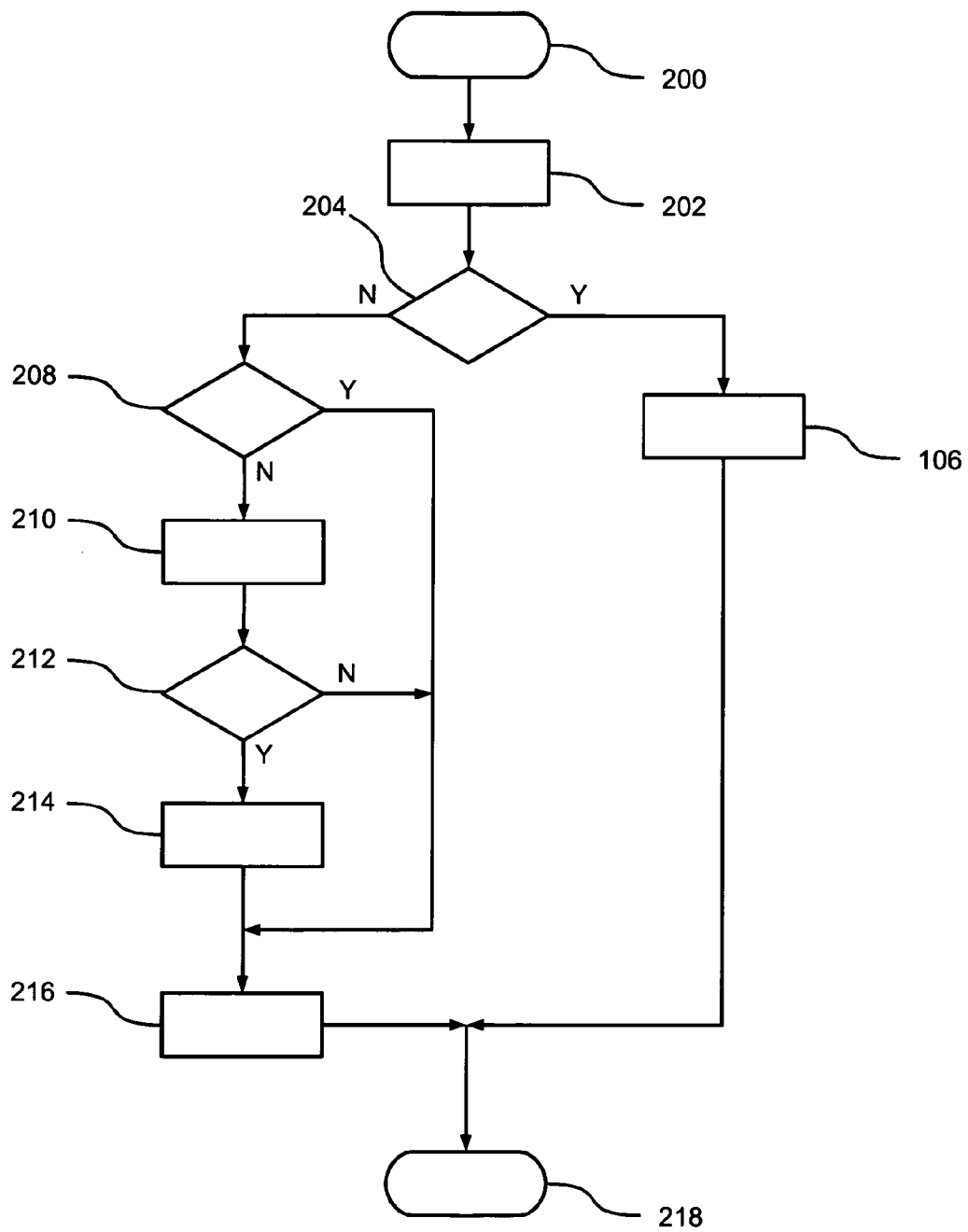
FIG. 6 is a flow chart illustrative of operation of the arrangement described herein when a Prune message is received.

The flowchart of FIG. 6 is illustrative of exemplary operation of a router in a network as described herein, when receiving a Prune*(S, G)—or Prune**(S, G)—message. The flowchart is described taking FIG. 4 as a reference.

Starting from a step 200, when the router receives (in a step 202) a Prune*(S, G)—or Prune**(S, G)—message from a downstream router, a verification is first made (in a step 204) as to whether the router has previously received a Join*(S, G) message related to the same multicast group.

If the step 204 yields a positive outcome, the router is located at the bifurcation of the old path and the new path (see e.g. the router R1 in the previous examples), and—in the step 106—will steer the path switchover process.

If the step 204 yields a negative outcome, the router is an intermediate router (e.g. R8, R9 or R10 in the previous examples). A verification is then made (in a step 208) as to whether the prune message is a Prune**(S, G) message.

In the case of e.g. R10, which receives the Prune*(S, G) message from R7, the step 208 will yield a negative outcome, meaning that the branch over which the prune message was received is to be discontinued. In that case, in a step 210, the router will set the corresponding interface (e.g. towards R7) to the "pruning" status (and then forward the Prune*(S, G) message to its upstream router, i.e. R9).

The router R9 will likewise receive the message Prune* (S, G) from R10 and set its interface towards R10 to the "Pruning" status, thus proceeding through the steps 200 to 210 of FIG. 6.

Unlike R10, R9 also has another branch (toward R11) over which the (S, G) flow is to be maintained and will not be cut.

The different conditions of e.g. R10 and R9 are detected in a step 212 where a check is made as to whether the flow is also to be sent over other interfaces.

In the case of e.g. R10, the step 212 will yield a negative outcome, and the router will proceed by forwarding the Prune*(S, G) message to the upstream router (step 216).

In the case of e.g. R9, the step 212 will yield a positive outcome, and before transmitting the message upstream, the router will modify it into a Prune**(S,G) message (step 214).

A router such as e.g. R8 will receive a Prune(S, G) message, which means that the branch towards R9 will not be cut. In the case of R8, the step 208 will yield a positive outcome, and the router will proceed directly to the step 216, i.e. to forwarding the Prune(S, G) message to its upstream router.

Again, step 218 denotes the end of the process.

Figure 7:
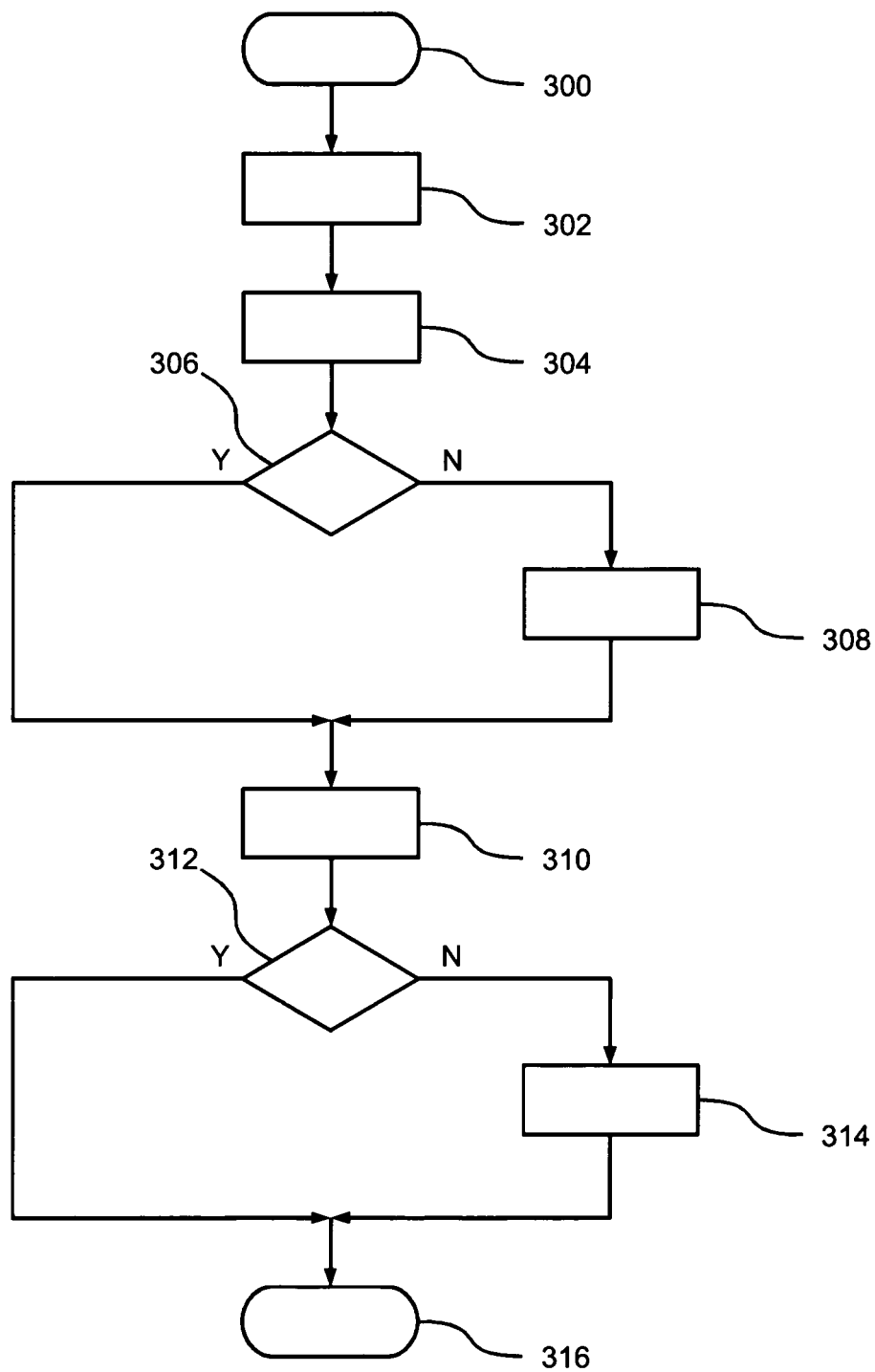
FIG. 7 is a flow chart illustrative of operation of the arrangement described herein when both a Join message and a Prune message are received.

The flowchart of FIG. 7 is representative of exemplary operation of a router such as R1 that, after a start step 300, ascertains—in a step 302—that it has received both the Join*(S, G) message and the Prune*(S, G) (or the Prune** (S, G) message) i.e. that either of the steps 104 or 204 of FIGS. 5 and 6 have yielded a positive outcome. As indicated, if a router receives both a Join*(S, G) message and a Prune*(S, G)—or Prune**(S, G)—message related to the same multicast group, this means that the router is at point of bifurcation of the old and the new path and shall therefore steer the path switch process (i.e. step 106 of FIGS. 5 and 6).

The description herein refers to the situations portrayed in FIGS. 3 and 4.

When e.g. R1 decides to start the path switch process, in a step 304 it marks a packet (e.g. the Nth packet) in the multicast flow currently sent towards R3, that is towards the router in the "old" path from which the Prune*(S, G)—or Prune**(S, G)—message has been received. This marking denotes the packet being marked as the last packet to reach the receiver R7 over the old path.

It will be appreciated that such marking does in no way amount to—numbering—the packets, but merely to indicating that the one considered will be the last packet sent to the receiver R7 over the old path.

In a step 306 a check is made as to whether the prune message received is a Prune*(S, G) message or a Prune**(S, G) message. In the case of FIG. 3, where the whole branch from R3 to R7 will be cut, the prune message received is a Prune*(S, G) message and the check of step 306 yields a negative outcome. In a step 308 the flow (S, G) is interrupted on that branch of the tree after sending the marked packet.

If, conversely, the prune message received from R3 is a Prune**(S, G) message (as is the case of FIG. 4, where routers other than R7 located downstream of R3 are requesting the flow (S, G)) the check of step 306 yields a positive outcome. Therefore R1 will not interrupt the flow after the marked packet, and another router located downstream of R1 will terminate transmission of the multicast flow over the branch from R9 to R7 as detailed in the flowchart of FIG. 8.

Whichever the outcome of the step 306, in a step 310 the router will proceed by marking the packet subsequent to the packet marked in the step 304. However, contrary to the Nth packet of step 304 (which is sent to R3), the subsequent marked packet (i.e. the N+1th packet in the flow) is sent towards R2, that is towards the router from which the Join*(S, G) message was received; this N+1th packet will be the first packet sent to the router R7 (and the receiver RB) over the new path.

Again it will be appreciated that such marking does in no way amount to numbering the packets, but merely to indicating that the one considered will be the first packet sent to the receiver R7 over the new path.

In step 312 a check is made as to whether the router involved (R1 in the example considered herein) is already sending the multicast flow to the interface over which the Join*(S, G) was received.

For instance, if R1 was not already sending the (S, G) flow to R2 (as in the scenario of FIG. 4), the step 312 will yield a negative outcome, and in step 314 the router will start sending the (S, G) flow to R2 beginning from the packet marked in step 310 (i.e. the N+1th packet). If, conversely, R1 was already sending the (S, G) flow to R2 as this was requested by another receiver, the step 312 will yield a positive outcome, and another router located downstream will take care of starting transmission of the flow (from the N+1th packet) over the branch from R4 to R7, as better detailed in the flowchart of FIG. 8.

Again, step 316 denotes the end of the process.

Figure 8:
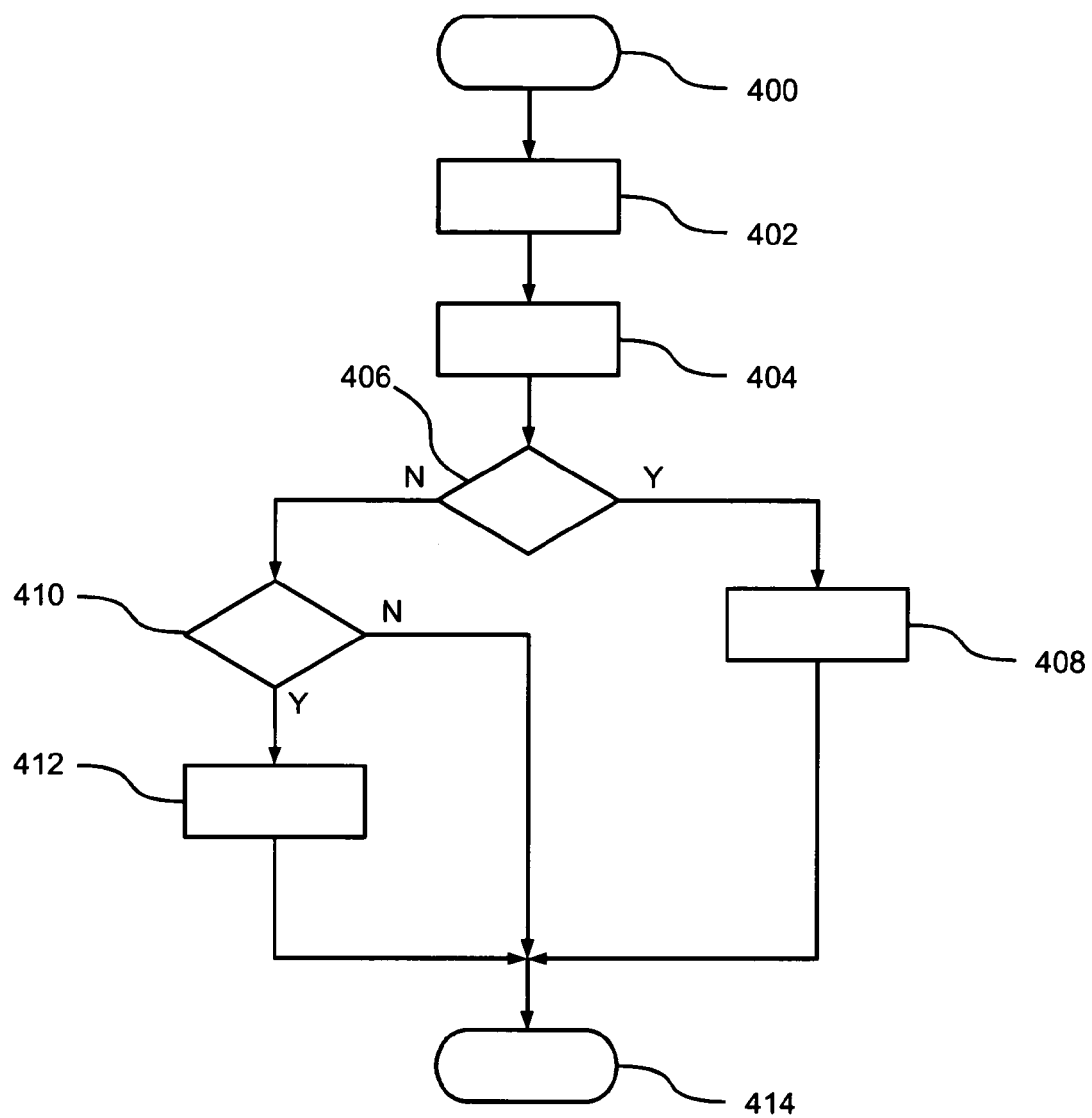
FIG. 8 is a flow chart illustrative of operation of the arrangement described herein when a market multicast data packet is received

The flowchart of FIG. 8 is representative of operation of a router receiving a data packet marked as a multicast packet according to the arrangement previously described. The flowchart of FIG. 8 refers to the situation of FIG. 4.

When, after a start step 400, a router receives—in a step 402—a packet marked as belonging to a multicast flow (S, G), the router will send that packet to all the interfaces of the Outgoing List associated to the group (inclusive of those set to the "pending" or "pruning" status). This will occur in a step 404.

The behavior of the router will then be differentiated according to whether it is located on the old path or the new path.

In a step 406 a check is made as to whether the router has an interface set to the "pruning" status. If that is the case, i.e. the check 406 yields a positive outcome, which may be indicative of the router being located on the old path, in a step 408, after dispatching the marked packet on such an interface (as previously detailed), the interface is cancelled from the Outgoing List associated with the group (S, G), so that all the following packets are no longer sent over the corresponding branch of the tree.

If the check 406 yields a negative outcome, a further check is made in a step 410 as to whether the router has an interface set to the "pending" status. If that is the case, i.e. the check 410 yields a positive outcome, which may be indicative of the router being located on the new path, in a step 412, after dispatching the marked packet on such an interface (as previously detailed), the "pending" status is removed form the interface, which is left in the Outgoing List associated to the group (S, G), so that beginning from such packet the flow will be sent (also) on the corresponding branch of the tree.

If both checks 406 and 410 yield a negative outcome, i.e. the router has no interfaces set either the "pruning" or "pending" status, the router merely performs its standard function of forwarding the traffic received.

Again, step 414 denotes the end of the process.

Without prejudice to the underlying principles of the invention, the details and the embodiments may vary, even appreciably, with respect to what has been described by way of example only, without departing from the scope of the invention as defined by the annexed claims.

The invention claimed is:

1. A method of transmitting multicast signals from a source to user terminals via multicast paths through a set of nodes in a network, comprising:

sending a modified join message from a first node toward said source via a new multicast path, wherein the modified join message instructs at least one new intermediate node to establish a new multicast path upon receipt of a marked data packet;

sending a modified prune message from the first node toward said source via an old multicast path, wherein the modified prune message instructs at least one old intermediate node to discontinue an old multicast path upon receipt of a marked data packet;

detecting the reception of the modified join message and the modified prune message at a second node in said network; and steering the multicast traffic from said source to said user terminal from said old multicast path over to said new multicast path.

2. The method of claim 1, wherein said second node in said network is located at the bifurcation of said new multicast path and said old multicast path.

3. The method of claim 1, wherein steering the multicast traffic comprises at least one of:
said second node directing said multicast traffic from said second node toward said user terminal over said new multicast path; and
said second node discontinuing transmission of said multicast traffic from said second node to said user terminal over said old multicast path.

4. The method of claim 1, wherein steering the multicast traffic comprises at least one of:
causing the new intermediate node in said new multicast path to direct said multicast traffic from said new intermediate node in said new multicast path to said user terminal; and
causing the old intermediate node in said old multicast path to discontinue transmission of said multicast traffic from said old intermediate node in said old multicast path to said user terminal.

5. The method of claim 1, comprising:
said second node in said network marking a first data packet to denote a first packet to be sent to said user terminal over said new multicast path, and
said second node in said network marking a last data packet to denote a last packet to be sent to said user terminal over said old multicast path.

6. The method of claim 1, wherein said first node is a last-hop router.

7. A node for a multicast communication network wherein multicast traffic from a source is sent to user terminals via multicast paths through a set of nodes in a network, wherein corresponding modified join and prune messages are sent from a first node in a multicast path toward said source, said modified join message to establish a new multicast path from said source to a user terminal and said modified prune message to discontinue an old multicast path from said source to said user terminal, comprising a node configured to:
detect the reception of both said modified join message and said modified prune message and steer the multicast traffic from said source to said user terminal from said old multicast path over to said new multicast path;
detect the reception of said modified join message on a join reception interface without said corresponding modified prune message following and forward toward said source said modified join message by presetting said join reception interface for transmission of said multicast traffic unless already traversed by said multicast traffic; and
detect the reception of said modified prune message on a prune reception interface without said corresponding modified join message following and forward toward said source said modified prune message by pre-setting said prune reception interface for discontinuing transmission of said multicast traffic unless a same signal is also requested by another downstream user terminal on the same path.

8. The node of claim 7, configured to mark said multicast traffic, when steering the multicast traffic from said source to said user terminal, to denote at least one of:
a last packet to be sent to said user terminal over said old multicast path; and
a first packet to be sent to said user terminal over said new multicast path.

9. The node of claim 7, configured to:
receive in said multicast traffic a packet marked either as the last packet to be sent to said user terminal over said old multicast path or as the first packet to be sent to said user terminal over said new multicast path;
check whether the node comprises any of a prune interface pre-set for discontinuing transmission of said multicast traffic and, in case of a positive result, deleting any such prune interface pre-set for discontinuing transmission of said multicast traffic,
check whether the node includes any of a join interface pre-set for transmission of said multicast traffic, and, in case of a positive result,
forward said marked packet if the node does not include any such pre-set prune or join interfaces.

10. The node of claim 7, configured to, when detecting the reception of said modified prune message on a prune reception interface without said corresponding modified join message following:
check whether said multicast traffic is sent to any user terminal other than said user terminal; and
if any such other user terminal exists, forward toward said source said modified prune message as a modified prune message**.

11. The node of claim 10, configured to:
mark said multicast traffic to denote a last packet to be sent to said user terminal over said old multicast path;
if the modified prune signal as received is not said modified prune message**, discontinue sending said multicast traffic over said old multicast path after said last marked packet;
mark said multicast traffic to denote a first packet to be sent to said user terminal over said new multicast path; and
continue sending, or start sending from a first marked packet, said multicast traffic to said user terminal over said new multicast path.

12. A communication network wherein multicast traffic from a source is sent to user terminals via a set of nodes, said network configured to send corresponding join and prune messages from a first node in a multicast path toward said source, said join message to establish a new multicast path from said source to said user terminal and said prune message to discontinue an old multicast path from said source to said user terminal, the network configured to perform the method of claim 1.

13. The communication network of claim 12, comprising a plurality of nodes wherein multicast traffic from a source is sent to user terminals via multicast paths through a set of nodes in a network, wherein corresponding join and prune messages are sent from a first node in a multicast path toward said source, said join message to establish a new multicast path from said source to a user terminal and said prune message to discontinue an old multicast path from said source to said user terminal, the node configured to:
detect the reception of both said join message and said prune message and steering a switch of a path for transmitting multicast signals from said source to said user terminal from said old multicast path over to said new multicast path;
detect the reception of said join message on a join reception interface without said corresponding prune message following and forwarding toward said source said join message by presetting said join reception interface for transmission of said multicast traffic unless already traversed by said multicast traffic; and
detect the reception of said prune message on a prune reception interface without said corresponding join message following and forwarding toward said source said prune message by pre-setting said prune reception interface for discontinuing transmission of said multicast traffic unless a same signal is also requested by another downstream user terminal on the same path.

14. A non-transitory computer-readable medium comprising software code portions, loadable in the memory of at least one computer and configured to perform the method of claim 1 when the computer program software code portions are run on a computer.

* * * * *